United States Patent [19]

Callender et al.

[11] 4,361,011

[45] Nov. 30, 1982

[54] CRYOGENIC COOLING SYSTEM

[75] Inventors: Robert E. Callender, Woodbridge, Va.; James T. Montgomery, Wheaton, Md.

[73] Assignee: The United States of America as represented by the Secretary of the Army, Washington, D.C.

[21] Appl. No.: 300,533

[22] Filed: Sep. 9, 1981

[51] Int. Cl.³ .............................................. F25B 21/02
[52] U.S. Cl. ........................................ 62/3; 62/228; 62/514 R; 236/91 G
[58] Field of Search ...................... 62/514 R, 227, 228, 62/3; 236/91 G

[56] References Cited

U.S. PATENT DOCUMENTS

| 4,024,725 | 5/1977 | Uchida et al. | 236/91 G |
| 4,134,447 | 1/1979 | Jennings et al. | 62/514 R |
| 4,199,953 | 4/1980 | Richter, Jr. et al. | 62/514 R |

*Primary Examiner*—Ronald C. Capossela
*Attorney, Agent, or Firm*—Robert P. Gibson; Milton W. Lee; Aubrey J. Dunn

[57] ABSTRACT

In order to conserve battery power of an electrically-operated cryogenic cooler for an infrared imaging detector, a control logic is inserted between the battery and the cooler. This logic operates to maintain the detector at a higher than optimum operating temperature in a "STANDBY" mode, but holds the detector at optimum temperature in an "ON" mode.

3 Claims, 2 Drawing Figures

CRYOGENIC COOLING SYSTEM

The invention described herein may be manufactured, used, and licensed by the U.S. Government for governmental purposes without the payment of any royalties thereon.

BACKGROUND OF THE INVENTION

This system is in the field of coolers for thermal imagers; such coolers may take any one of several forms. For instance, gas-expansion coolers, Peltier effect coolers, and mechanical-compressor refrigerators (such as Sterling cycle) are all used. When such coolers are used for portable equipment, various types of coolers have various advantages. For simplicity, a gas-expansion cooler would seem ideal; however, temperature control of such a cooler is difficult and special equipment and trained operators are required to refill the compressed air bottles usually used with such coolers. Obviously, a mechanical-compressor refrigerator (or another type of electrically-powered cooler) is able to operate only for a limited time on battery power; if the cooler operates continuously, intervals between battery charges or recharges are least. If the cooler is only energized when one desires to view a thermal image, the battery life may be greatly extended, but some time interval must be allowed for the cooler to cool the thermal imager from ambient to cryogenic temperatures. For particular cooler-imager combinations, this interval may be as long as five minutes. In the case where such a combination is being used for military observation or surveilliance, such a reaction time may be unacceptably long. The present invention is able to provide extended battery life for an imager, but without totally sacrificing reaction time.

SUMMARY OF THE INVENTION

The invention is a cryogenic cooling system including a battery-powered cooler which may be used with a thermal imager. The system initially cools down to a standby temperature higher than the normal operating temperature of the imager and maintains this temperature until one desires to use the imager. When the imager electronics are energized, the system operates to cool the imager to its normal operating temperature.

DESCRIPTION OF PREFERRED EMBODIMENT

Figure 1:
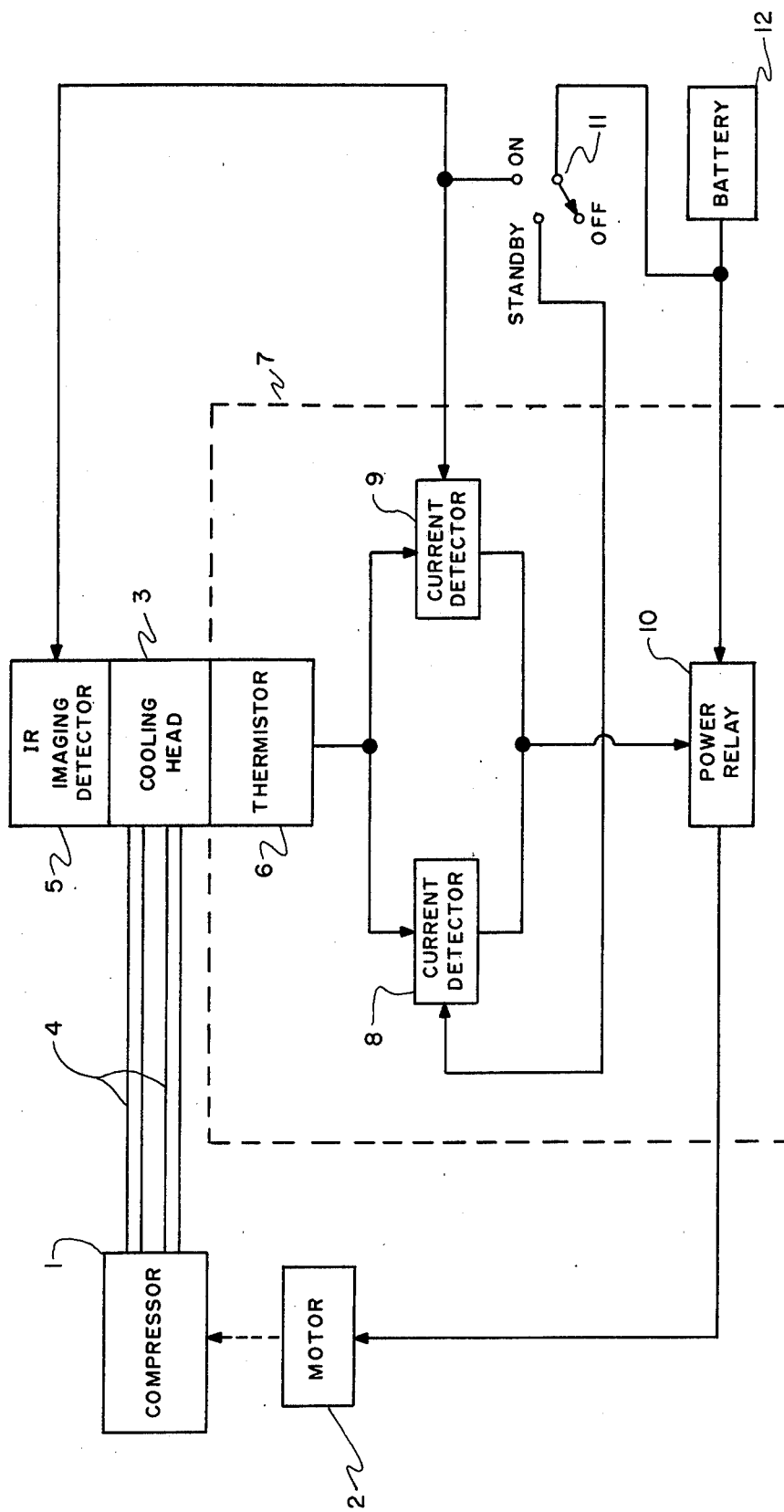
FIG. 1 is a schematic diagram of one embodiment of the invention.

The invention may be best understood by referring to the drawings, in which reference numeral 1 of FIG. 1 designates a mechanical refrigerator compressor driven by electric motor 2. The compressor may be of the Sterling-cycle type or equivalent and the motor may be of the series-wound, direct current type. Compressor 1 is connected to cooling head 3 by refrigerant lines 4; all of lines 4, compressor 1 and cooling head 3 contain the usual gaseous refrigerant for a cooling system. Mounted on cooling head 3 are imaging detector 5 and temperature sensor such as a thermistor or transistor 6. Detector 5 may be an array of photosensitive elements for providing a visible image of an infrared scene; for most efficient operation, these elements must be cryogenically cooled. In a particular application, detector 5 may have an optimum operating temperature of 80° K. and may be usable up to a temperature of 100° K. In order for a particular Sterling cooler to reach these temperatures, three and five minutes of operation respectively are required. Obviously, to maintain 80° K. requires more power than 100° K., and it is advantageous to hold at 100° K. for stand-by operation, so far as extended battery life is concerned. The invention is able to so do because of the unit logic in dotted-line rectangle 7. This unit includes previously mentioned thermistor 6, first and second current monitors or detectors 8 and 9, and power relay 10. Unit 7 is controlled by three-position switch 11. Both relay 10 and switch 11 are connected to battery 12. With the movable contact of switch 11 in the position as shown on the drawing, the system is off, i.e., neither motor 1 nor detector 5 is energized. In the STANDBY position of switch 11, current detector 8 is energized. This detector in turn energizes power relay 10; the relay energizes motor 2 to operate compressor 1. As the compressor operates, the temperature of cooling head 3 drops and is monitored by temperature sensor 6. When the temperature reaches the desired level (100° K., for example), the resistance of temperature sensor 6 is such that the current through detector 8 allows the detector to deenergize power 10. Motor 2 thus stops until the temperature of cooling head 3 rises above the desired level. It might be useful at this point to discuss the contents of detector 8 (and 9). This detector may include a Schmitt trigger whose input is connected to the common point of two series-connected resistors, one of the resistors being connected to the feed line from the STANDBY connection of switch 11, and the other resistor being thermistor 6, with an end grounded. The output of the trigger is connected to the actuating coil of relay 10. It should be understood that, although battery 12 has been shown with a single power lead, it will also include a ground connection, with suitable ground connections for elements 2, 5, and 7. When it is desired to use imaging detector 5, switch 11 is operated to its ON position; in this position, current detector 9 is energized, as is imaging detector 5. Detector 9 in turn energizes power relay 10 to provide power to motor 2. Compressor 1 is thus operated until cooling head 3 reaches the optimum temperature for detector 5 (80° K., for example). When this temperature is reached, detector 9 deenergizes relay 10, etc. When through using imaging detector 5, the user may either operate switch 11 to STANDBY, whereby the temperature of cooling head 3 will rise until it reaches the level as controlled by detector 8 and thermistor 6, or may operate the switch to OFF.

Figure 2:
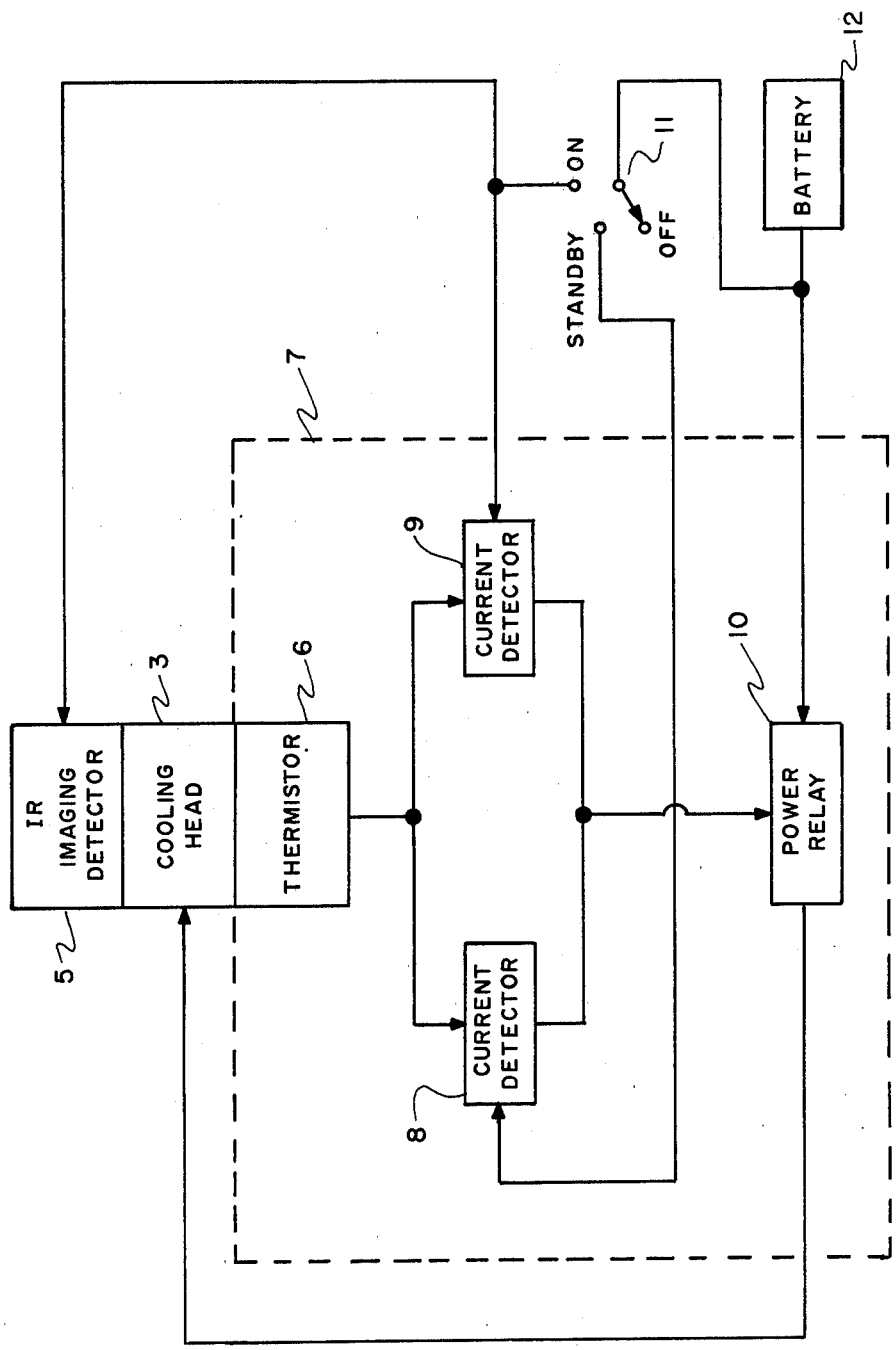
FIG. 2 is a schematic diagram of another embodiment of the invention.

FIG. 2 is similar to FIG. 1 in some respects and the same reference numerals are used for corresponding elements. However, elements 1, 2, and 4 of FIG. 1 are omitted, since cooling head 3 of FIG. 2 is a thermoelectric cooler such as one using the Peltier effect. Obviously, such a cooler may be attached to a cold finger carraying the detector, or the detector (and the thermistor) may be directly mounted on the cooler.

We claim:

1. A cryogenic cooling system including an electrically-powered cooling head means, a temperature sensor for said cooling head, a battery for powering said means, the improvement comprising:

a control means between said battery and said cooling head means, said control means including:

means, responsive to said temperature sensor for controlling said battery to said cooling head means until a first predetermined temperature of said cooling head is reached;

means, responsive to manual control and to said temperature sensor, for connecting said battery to said cooling head means until a second predetermined temperature of said cooling head means is reached, whereby said second temperature is lower than the first and whereby first temperature is maintained until the last-mentioned means responsive is operated.

2. The system as set forth in claim 1 wherein said cooling head means includes:
- a compressor;
- a cooling head;
- passageways between said compressor and said cooling head;
- a cryogen in said compressor, in said cooling head, and in said passageways; and
- an electric motor mechanically connected to said compressor for operating same.

3. The system as set forth in claim 1 wherein said cooling head means is a thermoelectric device.

* * * * *